(12) United States Patent
Wang

(10) Patent No.: US 9,018,566 B2
(45) Date of Patent: Apr. 28, 2015

(54) MULTI-FUNCTIONAL ELECTRIC COOKER

(76) Inventor: Jialing Wang, Suizhou (CN)

(*) Notice: Subject to any disclaimer, the term of this patent is extended or adjusted under 35 U.S.C. 154(b) by 0 days.

(21) Appl. No.: 13/142,824

(22) PCT Filed: Mar. 11, 2009

(86) PCT No.: PCT/CN2009/070728
§ 371 (c)(1),
(2), (4) Date: Jun. 29, 2011

(87) PCT Pub. No.: WO2010/091558
PCT Pub. Date: Aug. 19, 2010

(65) Prior Publication Data
US 2011/0266273 A1    Nov. 3, 2011

(30) Foreign Application Priority Data
Feb. 11, 2009 (CN) .......................... 2009 1 0007610

(51) Int. Cl.
| | |
|---|---|
| *H05B 1/00* | (2006.01) |
| *A47J 27/06* | (2006.01) |
| *A47J 27/00* | (2006.01) |
| *A47J 27/082* | (2006.01) |
| *A47J 27/62* | (2006.01) |

(52) U.S. Cl.
CPC .................. *A47J 27/06* (2013.01); *A47J 27/004* (2013.01); *A47J 27/082* (2013.01); *A47J 27/62* (2013.01)

(58) Field of Classification Search
USPC ..................................... 99/403, 407; 119/245
See application file for complete search history.

(56) References Cited

U.S. PATENT DOCUMENTS

| | | | | |
|---|---|---|---|---|
| 3,391,271 | A * | 7/1968 | Campbell | 219/440 |
| 4,995,312 | A * | 2/1991 | Leiros | 99/411 |
| 5,092,229 | A | 3/1992 | Chen | |
| 6,028,297 | A * | 2/2000 | Hamada et al. | 219/625 |
| 6,281,483 | B2 * | 8/2001 | Yagi et al. | 219/621 |
| 6,283,015 | B1 * | 9/2001 | Kwon et al. | 99/337 |
| 6,486,446 | B1 * | 11/2002 | Kao | 219/438 |
| 6,987,247 | B2 * | 1/2006 | Schaffeld et al. | 219/438 |
| 7,388,174 | B2 * | 6/2008 | Ejaz et al. | 219/429 |
| 8,157,925 | B1 * | 4/2012 | Templin | 134/166 R |

(Continued)

FOREIGN PATENT DOCUMENTS

| | | |
|---|---|---|
| CN | 2596898 Y | 1/2004 |
| CN | 2633158 Y | 8/2004 |
| CN | 2698224 Y | 5/2005 |

(Continued)

OTHER PUBLICATIONS

International Search Report for PCT/CN2009/070728.

*Primary Examiner* — Tu B Hoang
*Assistant Examiner* — Amit K Singh
(74) *Attorney, Agent, or Firm* — Venable LLP; Henry J. Daley

(57) ABSTRACT

A multi-functional electric cooker includes a heating boiler body (1) and a cover (2). The cooker also includes a rice soup collecting container (3) which is mounted between the heating boiler body (1) and the cover (2), a sealing ring (7) which is set between the rice soup collecting container (3) and the heating boiler body (1), and a rice soup sucker (6). An opening of one end of the sucker is located at the bottom of the rice soup collecting container (3) and the height of the opening is adjusted along with the amount of the rice in the heating boiler body. An opening of the other end of the sucker is located in the rice soup collecting container (3).

29 Claims, 13 Drawing Sheets

(56) References Cited

U.S. PATENT DOCUMENTS

| | | | |
|---|---|---|---|
| 2002/0060216 A1* | 5/2002 | Chan | 219/430 |
| 2006/0137540 A1* | 6/2006 | De' Longhi | 99/403 |

FOREIGN PATENT DOCUMENTS

| | | |
|---|---|---|
| CN | 201360906 Y | 12/2009 |
| JP | 58-031948 A | 2/1983 |
| JP | 2004-105488 A | 4/2004 |
| JP | 2005-111037 A | 4/2005 |
| JP | 2006-255062 A | 9/2006 |
| KR | 0164864 B1 | 12/1998 |
| KR | 20040083729 A | 10/2004 |
| KR | 200550018833 A | 2/2005 |
| KR | 10-0793408 B1 | 1/2008 |

* cited by examiner

MULTI-FUNCTIONAL ELECTRIC COOKER

This application claims priority to the Chinese Patent Application No. 200910007610.3 filed with the Chinese Patent Office on Feb. 11, 2009, and is a national stage application under 35 U.S.C. §371 of PCT/CN2009/070728 filed Mar. 11, 2009, the entire contents of which are incorporated herein by reference.

FIELD OF THE INVENTION

The present invention relates to a multi-functional electric cooker, in particular, to a multi-functional electric cooker which can extract rice soup and cook rice crust congee.

BACKGROUND OF THE INVENTION

The traditional folk method for cooking rice crust congee includes the steps of: filling sufficient water into an iron wok on a kitchen stove; pouring the cleaned rice into the wok after the water is boiled; stirring the rice with gourd ladle occasionally without covering the wok, so as to avoid the rice from attaching on the wok; fading the fire in the stove when the rice is cooked medium well, so as to prevent the soup from charring; ladling the cooked rice and the rice soup into a drain basket under which a ceramic basin is placed, such that the cooked rice and the rice soup are separated through the holes of the drain basket; then putting the cooked rice into the wok cleaned; pouring a little of clean water around the inner periphery of the wok; put a cover onto the wok, wherein the gaps between the wok and the cover should be blocked with a dishcloth rolled into an elongated strip; then cooking the rice with the remained fire within the stove slowly; when one can smell fragrance, filling the cooked rice into bowls, meanwhile, pouring all the rice soup into the wok, and stirring it with the rice crust, cooking with low fire, until now, the fragrant rice crust congee is finished.

This method for cooking the rice crust congee is complex in procedures, and depends on the experience and feeling of the cook, or else, the rice may become rice paste or burned. This method is seldom used in the majority of the other areas expect the fewer rural areas, since it cost too much time and labor. However, people wishes to enjoy the rice crust congee.

The Chinese invention patent with the patent number 200420034486.2 discloses an electric cooker which can separate the cooked rice from the soup automatically. In this patent, a separating layer is provided within an inner vessel so as to separate the inner vessel into a cooked rice vessel and a rice soup vessel. The top of the separating layer is formed with a rice soup overflow opening. The excess water within the cooked rice vessel forms the rice soup when cooking, and the rice soup overflows into the rice soup vessel through the rice soup overflow opening. This electric cooker can only produce rice soup, but cannot produce rice crust, and the rice soup can overflow through the outflow opening only when the rice and the water are filled more than a certain level. However, it is difficult to ensure that the amount of the remaining water is suitable for the amount of the rice, which will likely cause the cooked rice to become rice paste, sticky or dilute, affecting the taste disadvantageously. Besides, the rice soup cannot be taken out or flow out voluntarily, nor can it be used to cook rice crust congee.

SUMMARY OF THE INVENTION

In view of the above problems, the object of the invention is to provide a multi-functional electric cooker which can control the amount of water for cooking the rice and can extract the rice soup, and can cook rice crust congee.

In order to achieve the above object, the present invention provides the following technical solutions.

A multi-functional electric cooker includes a heating boiler body and a cover, and also includes:

a rice soup collecting container mounted between said heating boiler body and the cover;

a sealing ring provided between the rice soup collecting container and the heating boiler body;

a rice soup sucker, an opening of one end thereof being located at a bottom of the rice soup collecting container and the height of the opening being adjustable with the amount of rice in the heating boiler body, and an opening of the other end thereof being located within the rice soup collecting container.

In one embodiment of the invention, a fixing assembly is mounted on a top of the rice soup collecting container, and the fixing assembly includes:

a fixing plate for closing the rice soup collecting container, on which a fixing plate steam escaping hole is provided;

a fixing ring mounted on an edge of the fixing plate, on a peripheral of which three insertion pieces are provided, among the three insertion pieces, at least one being a fixing insertion piece, and the other being elastic insertion pieces, each elastic insertion piece having a handle which corresponds to a hole of the cover at a corresponding position; and a second sealing ring located between the fixing plate and the rice soup collecting container.

The fixing assembly is connected with an edge of said rice soup collecting container by screws.

In another embodiment of the invention, a fixing assembly is mounted on a top of the rice soup collecting container, and the fixing assembly includes:

a fixing plate for closing said rice soup collecting container, including:

two hooks extending from a peripheral of the fixing plate towards an edge of the rice soup collecting container, and configured to be coupled with a hook loop provided at a side of the rice soup collecting container, a steam escaping hole provided on the fixing plate, an elastic snap-fixing member, including:

a fixing casing mounted on a top of the fixing plate, a telescopic member mounted in the fixing casing telescopically, and configured to connect with a snap finger that is provided alongside the rice soup collecting container, a first spring located between said fixing casing and the telescopic member; and a second sealing ring located between the fixing plate and the rice soup collecting container.

Three radial bulges are provided on the peripheral of the fixing plate. Two of the radial bulges correspond to the holes provided at an inner side of the cover, and the third bulge corresponds to the elastic ring clasp provided at a front end of said cover.

A steam escaping valve is provided above the steam escaping hole, and the steam escaping valve includes:

a supporting seat mounted in a valve cavity provided inside the telescopic member, and having an annular sidewall and an annular supporting end extending from the annular sidewall inwardly;

a valve core, one end thereof being located in the supporting seat, the other end thereof protruding out of a top of the telescopic member;

a second spring located between the annular supporting end and the valve core; and a driving component for driving the valve core.

The driving component includes:

a pressing rod abutting against a top of the valve core;

a driving rod, one end thereof having a driving inclination surface and located on the top of the pressing rod, and the other end thereof being connected to an electromagnetic driving member; and a return spring for returning the pressing rod.

Alternatively, at least two insertion pieces may also be provided on the peripheral of the rice soup collecting container, and the insertion pieces are inserted in holes which are provided on the cover. A second sealing ring is provided between the rice soup collecting container and the cover, and a steam escaping hole is provided on the top of the cover. The rice soup collecting container is mounted on the cover by the insertion pieces, and can be raised together with the cover.

Preferably, the number of the insertion pieces is three, and they are distributed evenly on the peripheral of the rice soup collecting container, and at least one of them is a fixing insertion piece, and the other are elastic insertion pieces. Each elastic insertion piece has a handle. The rice soup collecting container may be removed from the cover by operating the handle to facilitate cleaning.

In one embodiment of the invention, the rice soup sucker is hinged at the bottom of the rice soup collecting container, and provided with a suspending device at one end thereof. A pushing bar is provided at the bottom of the rice soup collecting container, and configured to push the rice soup sucker away from the bottom of the rice soup collecting container when the heating boiler body is heated to a predetermined temperature and maintained for a set time. The predetermined temperature is determined in advance, for example, 100° C., and can be detected by a temperature sensor, and the set time can be set by the user basing on the amount of the rice, the amount of the water and the required soft or hard taste. The rice soup sucker is supported on the surface of rice after the rice soup sucker falls down under the pushing force of the pushing bar, and the opening of the sucker is located under the water level. The rice soup is sucked into the rice soup collecting container under the pressure inside the sealed heating boiler body. Since there is a distance between the opening of the sucker and the water level, it can ensure the amount of the water remained within the heating boiler body, and can ensure the cooking quality and taste of the cooked rice.

The suspending device is an iron ring or a magnetic ring, and a magnet is provided at the corresponding position of the bottom of the rice soup collecting container. The suspending device is used for suspending the rice soup sucker at the bottom of the rice soup collecting container.

The rice soup collecting container also includes a rice soup outlet provided at the bottom of the rice soup collecting container, and an on-off valve is provided at the rice soup outlet.

The pushing bar is mounted in the rice soup outlet, and the bottom end of the pushing bar is fitted with the on-off valve for closing the rice soup outlet, and the top end of the pushing bar is connected with an electromagnetic driving device. A return device for holding the on-off valve at a return position where the on-off valve closes the rice soup outlet is mounted on the pushing bar. When the pushing bar is pushed downwardly, the rice soup sucker falls down, meanwhile the rice soup outlet is opened. At this time, the rice soup would not enter into the rice soup collecting container since the pressure within the heating boiler body is balanced with that within the rice soup collecting container. After the pushing bar is returned and its on-off valve closes the rice soup outlet, the rice soup is pressed into the rice soup collecting container through the sucker with the rising of the pressure within the heating boiler body.

The electromagnetic driving device is mounted in the cover, and includes an electromagnetic driving member and a sliding block driven by the electromagnetic driving member. The sliding block includes a horizontal sliding block and a vertical sliding block. One end of each of the horizontal sliding block and the vertical sliding block has a sliding inclination surface, and the horizontal sliding block and the vertical sliding block abut against each other via the sliding inclination surfaces, and the other end of the horizontal slide abuts against the electromagnetic driving member, and the other end of the vertical slide abuts against the pushing bar. This structure allows that the electromagnetic driving member to be arranged horizontally, so that the space occupied is reduced, and the horizontal movement of the electromagnetic driving member can be converted into vertical movement of the pushing bar by the horizontal sliding block and the vertical sliding block.

A tube body extends upwardly from the rice soup outlet, and the root of the tube body is provided with a hole. The return device includes a third spring sleeved on the pushing bar. One end of the third spring clips on an annular boss provided in the tube body, and the other end of the third spring clips on a protrusion of said the pushing bar. The on-off valve on the pushing bar is maintained to close the rice soup outlet under the elastic force of the spring.

The rice soup sucker includes a right-angle bushing provided at the bottom of the rice soup collecting container, a guiding tube extending from the right-angle bushing into the rice soup collecting container, a horizontal tube and a swing tube connected with the horizontal tube at right angle. The horizontal tube is connected to the right-angle bushing.

The right-angle bushing is connected with the guiding tube and the horizontal tube in a screw-type snap connection or in a bayonet connection.

The pushing bar is mounted in the rice soup outlet. The bottom of the pushing bar is fitted with an on-off valve for closing the rice soup outlet, and the top of the pushing bar is connected with a cam-driven device. A return device for holding the on-off valve at a return position where the on-off valve closes the rice soup outlet is also mounted on the pushing bar.

The cam-driven device includes a motor and a cam mounted on the shaft of the motor.

A detecting device for detecting the position of the pushing bar is provided alongside the pushing bar.

The detecting device is a photoelectric switch or a Hall element provided axially along the pushing bar.

In another embodiment of the invention, the rice soup sucker is vertically inserted in a sucker hole provided at the bottom of the rice soup collecting container, and is movable up and down along the sucker hole. The wall of the rice soup sucker is provided with scales.

A pushing bar is provided in the rice soup outlet. The pushing bar is mounted within the rice soup outlet. The bottom of the pushing bar is fitted with an on-off valve for closing said rice soup outlet, and the top of the pushing bar is connected with an electromagnetic driving device. A return device for holding the on-off valve at a return position where the on-off valve closes the rice soup outlet is also mounted on the pushing bar.

The electromagnetic driving device is mounted in the cover, and includes an electromagnetic driving member and a sliding block driven by the electromagnetic driving member. The sliding block includes a horizontal sliding block and a vertical sliding block. One end of each of the horizontal sliding block and the vertical sliding block has a sliding inclination surface, and the horizontal sliding block and the vertical sliding block abut against each other via the sliding inclination surfaces. The other end of the horizontal sliding block abuts against the electromagnetic driving member, and the other end of the vertical sliding block abuts against the pushing bar.

A tube body extends upwardly from the rice soup outlet. The return device includes a spring sleeved on the pushing bar. One end of the spring clips on an annular boss provided in the tube body, and the other end of the spring clips on a protrusion of the pushing bar.

Compared with the prior art, the multi-functional electric cooker according to the invention is provided with the rice soup collecting container, and the rice soup sucker is provided at the bottom of the rice soup collecting container. After the rice in the electric cooker is cooked to a predetermined temperature for a set time, the rice soup is sucked into the rice soup collecting container through the sucker by controlling the on-off valve to close the rice soup outlet. The amount of the rice soup sucked into the rice soup collecting container or the amount of the rice soup remained in the heating boiler body are controlled by the height of the opening of the rice soup sucker. When the opening of the sucker is exposed out of the water level of the rice soup, the pressures within the heating boiler body and the rice soup collecting container are balanced with each other since the steam within the heating boiler body can enter into the rice soup collecting container, so the rice soup is no longer sucked into the rice soup collecting container, so that the remained rice soup for cooking the rice is maintained at a suitable level, as a result, the duration and degree of cooking is preferable, and the taste of the cooked rice also is better. After the cooked rice is taken out, the rice soup returns to the heating boiler body, so as to further cook the rice crust congee. Thus, it is possible to cook the rice, to collect rice soup and to cook rice crust congee in one electric cooker, that is, the electric cooker has many functions, so it is more convenient to use. Since the rice crust is formed under a high temperature of the bottom of the electric cooker while the cooked rice is finished, the cover of the electric cooker is opened, and the rice soup storing device moves together with the cover. After taking the cooked rice into bowls, the rice crust is left within the inner vessel, and then the rice soup storing device moving with the cover is placed just above the inner vessel, and the rice soup flows into the inner vessel automatically and mixes with the rice crust, and then the rice crust congee is cooked by low fire.

Figure 1:
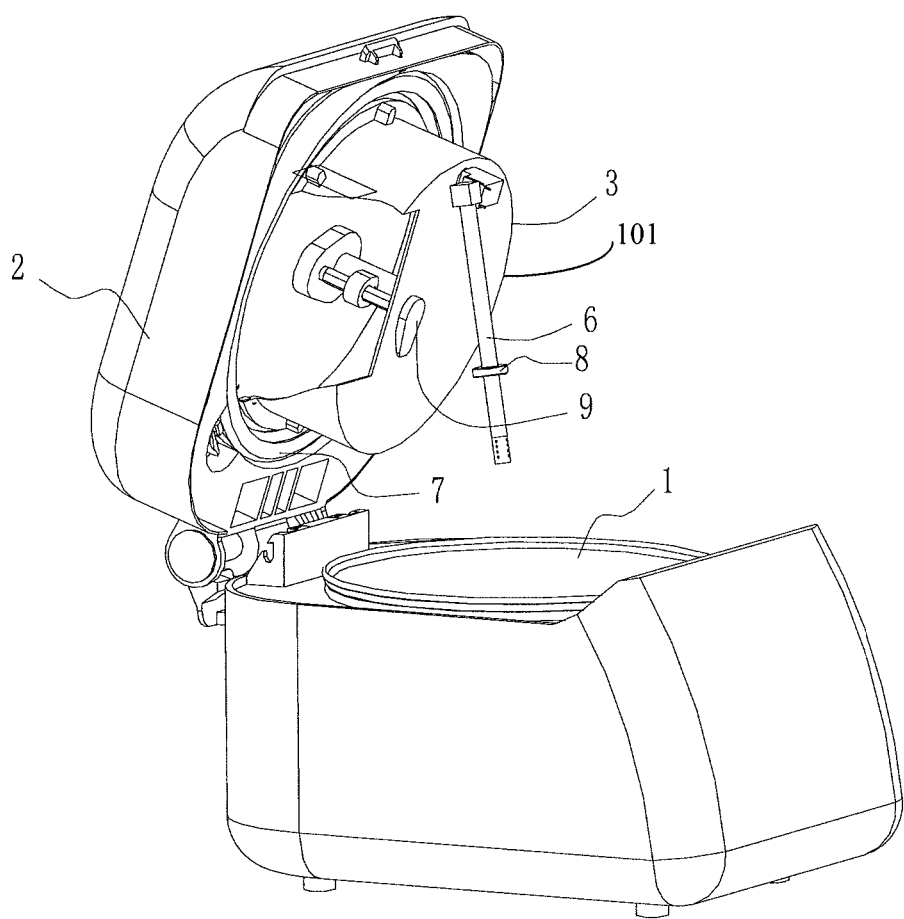
FIG. 1 is a perspective view of a multi-functional electric cooker according to the invention.

| Reference numerals in the figures: | |
|---|---|
| 1. heating boiler body | 2.2'. cover |
| 3. rice soup collecting container | 4.4'. fixing assembly |
| 5. electromagnetic driving device | 6. rice soup sucker |
| 7. sealing ring | 8. suspending device |
| 9. on-off valve | 10. elastic snap-fixing member |
| 11. driving component | 12. cam-driven device |
| 13. steam escaping valve | 14. photoelectric switch |
| 15. pipe-creeping pump | |
| 21. hole | 22. steam escaping hole |
| 21'. hole | 22'. elastic ring clasp |
| 31. rice soup outlet | 32. pushing bar |
| 33. tube body | 34. third spring |
| 35. hook loop | 36. snap finger |
| 41. fixing plate | 42. fixing ring |
| 43. fixed insertion piece | 44. elastic insertion piece |
| 45. handle | 46. second sealing ring |
| 47. fixing plate steam escaping hole | |
| 41'. fixing plate | 42'. hook |
| 43'. radial bulge | 44'. steam escaping hole |
| 51. electromagnetic driving member | 52. horizontal sliding block |
| 53. vertical sliding block | 54. sliding inclination surface |
| 61. right-angle bushing | 62. horizontal tube |
| 63. swing tube | 64. snap spring |
| 65. guiding tube | 66. hose |
| 67. filter | |
| 81. magnetic ring | 82. magnet |
| 83. housing | |
| 101. fixing casing, bottom portion of the rice soup sucker | |
| 102. telescopic member, top of the rice soup collecting container | |
| 103. first spring, distance from an opening of the other end of the rice soup sucker to the bottom portion of the rice soup collecting container | |
| 111. pressing rod | 112. driving rod |
| 113. electromagnetic driving member | 114. return spring |
| 121. motor | 122. cam |
| 131. supporting seat | 132. valve core |
| 133. second spring. | |

DETAILED DESCRIPTION

The invention will be described further in conjunction with the drawings and the specific embodiments below.

Referring to FIGS. 1 to 5, the multi-functional electric cooker according to the invention includes a heating boiler body 1 and a cover 2. The heating boiler body 1 may be a separate inner container, and also may be an assembled boiler body constituted of an inner container, a heater and a housing. The electric cooker further includes:

- a rice soup collecting container 3 mounted between the heating boiler body 1 and the cover 2;
- a sealing ring 7 provided between the rice soup collecting container 3 and the heating boiler body 1;
- a rice soup sucker 6 mounted at the bottom of the rice soup collecting container 3, and communicating with the rice soup collecting container 3, the height of a sucker opening of which can be adjusted along with the amount of the rice in the heating boiler body 1;
- a rice soup outlet 31 provided at the bottom of the rice soup collecting container 3; and
- an on-off valve 9 mounted at the rice soup outlet 31.

Figure 2:
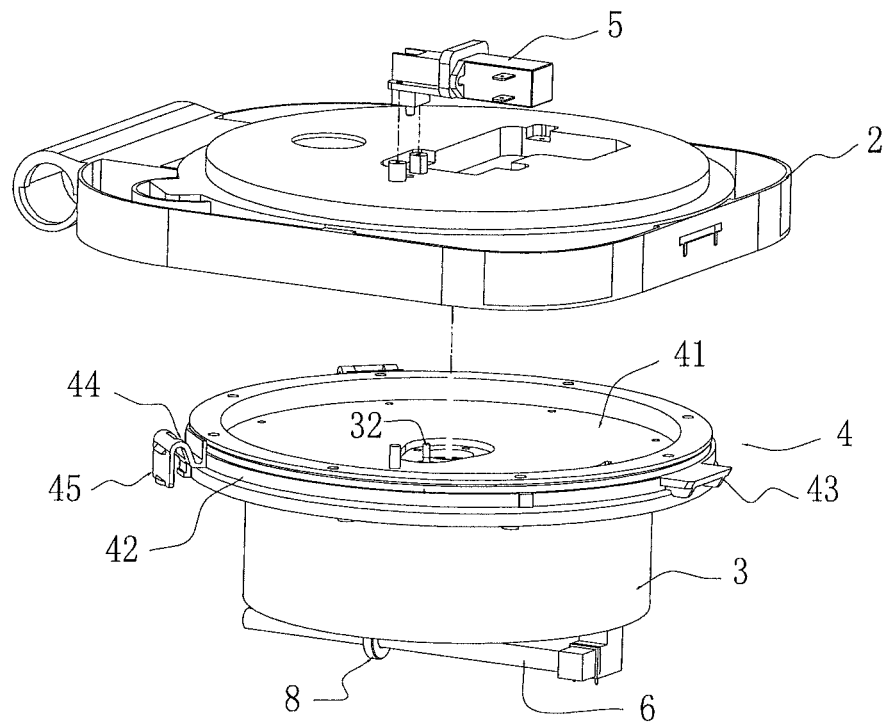
FIG. 2 is a structural schematic view of a rice soup collecting container and a cover in FIG. 1.
Figure 3:
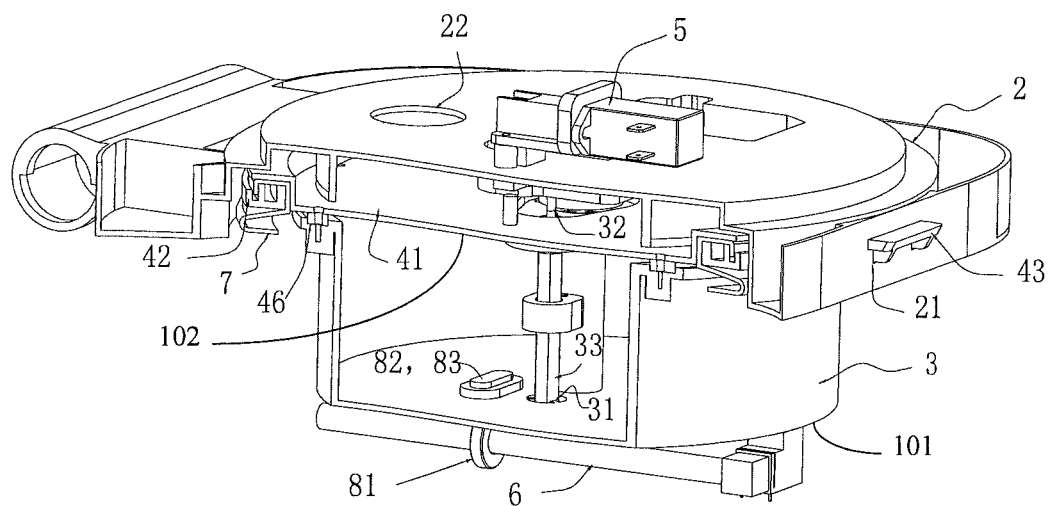
FIG. 3 is a structural schematic view of the rice soup collecting container and the cover after they are assembled.
Figure 4:
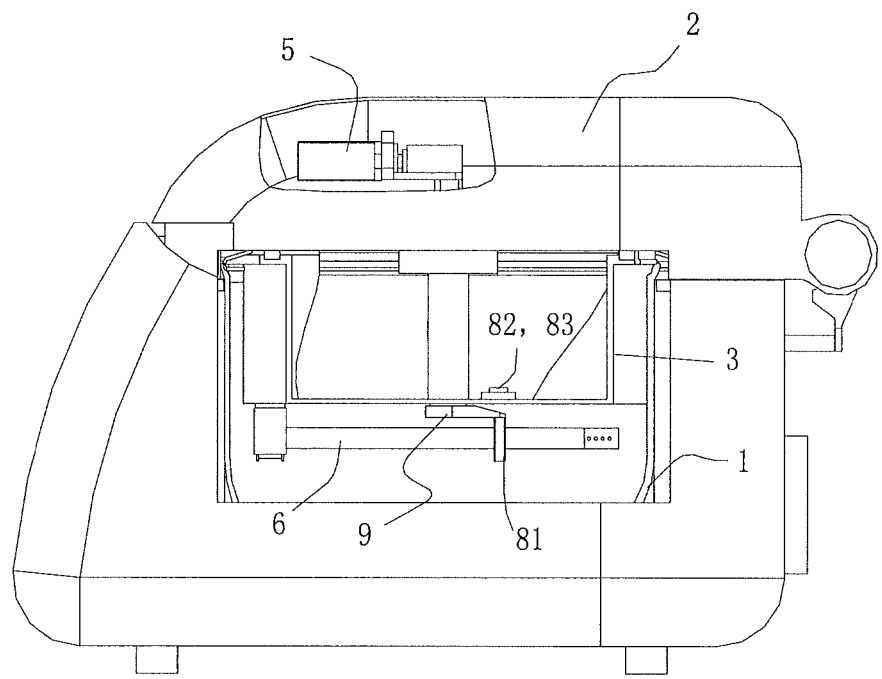
FIG. 4 is a schematic view showing the position of a rice soup sucker of the electric cooker shown in FIG. 1 when cooking the rice.
Figure 5:
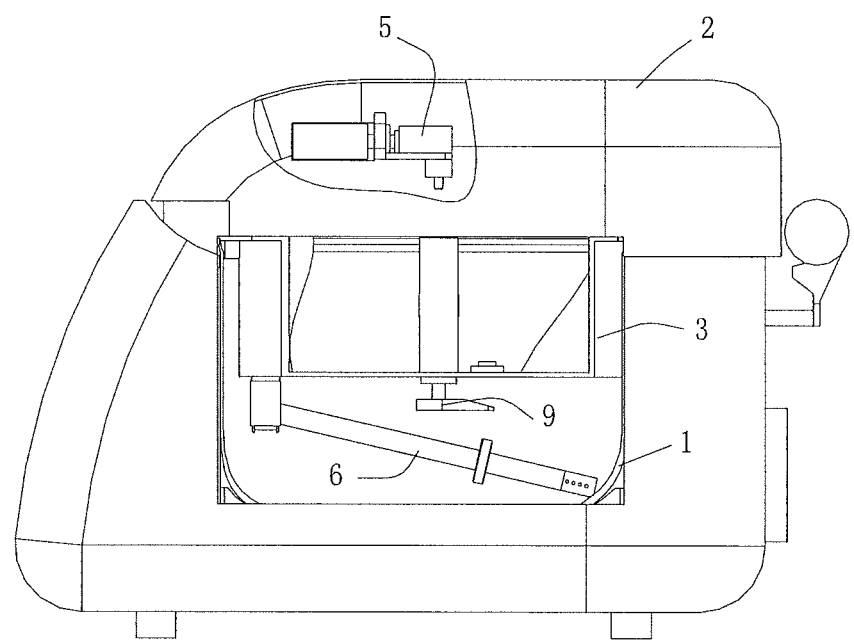
FIG. 5 is a schematic view showing the position of the rice soup sucker of the electric cooker shown in FIG. 1 when rice soup is collected.
Figure 6:
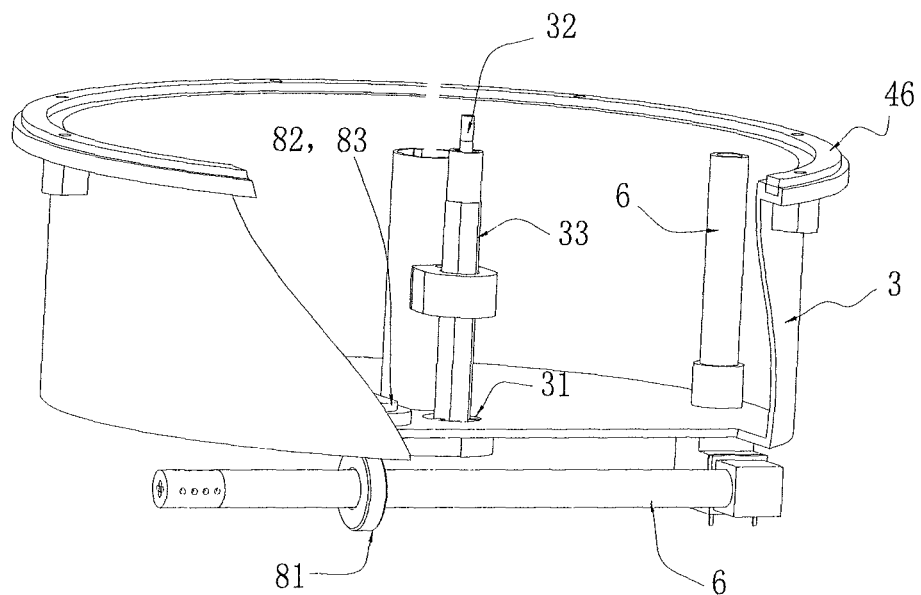
FIG. 6 is schematic view of the inner structure of the rice soup collecting container.
Figure 7:
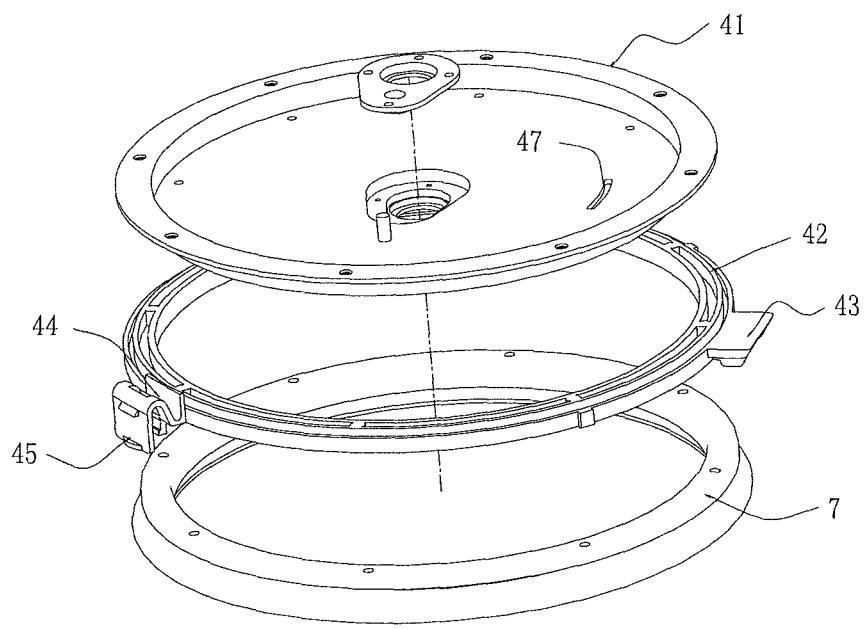
FIG. 7 is an exploded schematic view of a fixing assembly.

The rice soup collecting container 3 may be fixed on the cover 2 in the manner shown in FIGS. 2 and 3, that is, a fixing assembly is mounted on the top of the rice soup collecting container 3. As shown in FIGS. 6 and 7, the fixing assembly includes a fixing plate 41 for closing said rice soup collecting container 3, a fixing ring 42 mounted around the edge of the fixing plate 41 and a second sealing ring 46 located between the fixing plate 41 and the rice soup collecting container 3. A fixing plate steam escaping hole is provided on the fixing plate. Three insertion pieces are provided on the peripheral of the fixing ring 42. In this embodiment, two of these insertion pieces are fixing insertion pieces 43, and the other one is an elastic insertion piece 44 having a handle 45, and holes 21 are provided at the corresponding positions of the cover 2. The fixing assembly may be connected with the edge of the rice soup collecting container 3 by screws.

Figure 23:
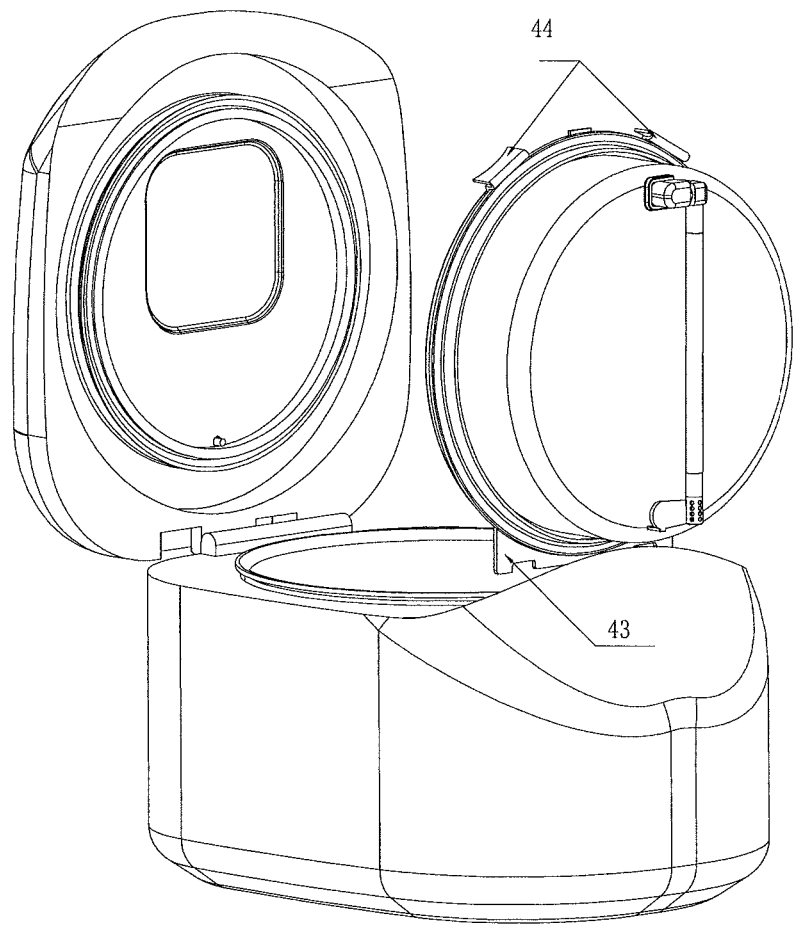
FIG. 23 is a schematic view of a third embodiment of the multi-functional electric cooker according to the invention.

Alternatively, at least two insertion pieces may be provided directly on the peripheral of the rice soup collecting container 3, and the insertion pieces are insertedly fitted in the holes 21 which are provided on the cover 2. A second sealing ring 46 is provided between the rice soup collecting container 3 and the cover 2, and a steam escaping hole 22 is provided on the top of the cover 2. The rice soup collecting container 3 is mounted on the cover 2 by the insertion pieces, and can be raised with the cover 2. The number of the insertion pieces preferably is three, and these insertion pieces are distributed evenly on the peripheral of the rice soup collecting container 3. In the third embodiment of the electric cooker according to the invention as shown in FIG. 23, one of the insertion pieces is a fixing insertion piece 43, and the other two are elastic insertion pieces 44. Each of the elastic insertion pieces 44 has a handle. The rice soup collecting container 3 may be removed from the cover 2 by operating the handles.

In the embodiment of the invention shown in FIGS. 1 to 5, the rice soup sucker 6 is hinged at the bottom of the rice soup collecting container 3. The end of the rice soup sucker 6 is provided with a suspending device 8, and the bottom of the rice soup collecting container 3 is provided with a pushing bar 32. The pushing bar 32 will push the rice soup sucker 6 away from the rice soup collecting container 3 when the heating boiler body 1 is heated to a predetermined temperature such as 100° C. and maintained for a set time.

Referring to FIGS. 3 and 6, the suspending device 8 is an iron ring or a magnetic ring 81, and a magnet 82 is provided at the corresponding position of the bottom of the rice soup collecting container 3. The magnet 82 is enclosed by a housing 83.

As shown in FIG. 6, the pushing bar 32 is mounted in the rice soup outlet 31. The bottom of the pushing bar 32 is fitted with an on-off valve 9 for closing the rice soup outlet 31, and the top of the pushing bar 32 is connected with an electromagnetic driving device 5. A return device for holding the on-off valve 9 at a return position where the on-off valve 9 closes the rice soup outlet 31 is mounted on the pushing bar 32.

A tube body 33 extends upwardly from the rice soup outlet 31, and a hole (not shown) is provided at the root of the tube body 33. The return device includes a third spring 34 which is surroundingly mounted on the pushing bar 32. One end of the third spring 34 clips on an annular boss provided in the tube body 33, and the other end clips on the protrusion of the pushing bar 32, seeing FIG. 15.

Figure 8:
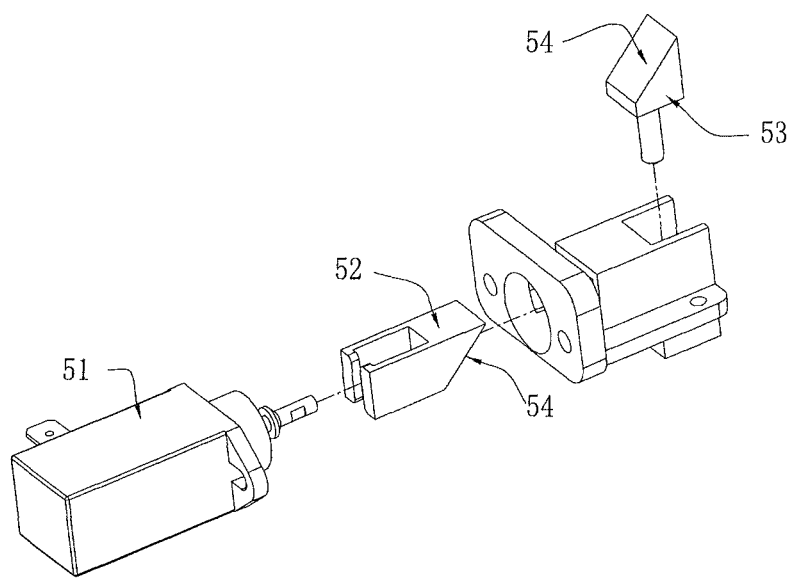
FIG. 8 is a structural schematic view of an electromagnetic driving device.

As illustrated in FIG. 8, the electromagnetic driving device 5 is mounted in the cover 2, and includes an electromagnetic driving member 51 and a sliding block driven by the electromagnetic driving member 51. The sliding block includes a horizontal sliding block 52 and a vertical sliding block 53. One end of the horizontal sliding block 52 and one end of the vertical sliding block 53 have sliding inclination surfaces 54 respectively, and they abut against each other via the sliding inclination surfaces. The other end of the horizontal sliding block 52 abuts against the electromagnetic driving member 51, and the other end of the vertical sliding block 53 abuts against the pushing bar 32. The above electromagnetic driving device 5 may also be replaced by linear driving devices such as wax motor, and gear and rack.

Figure 9:
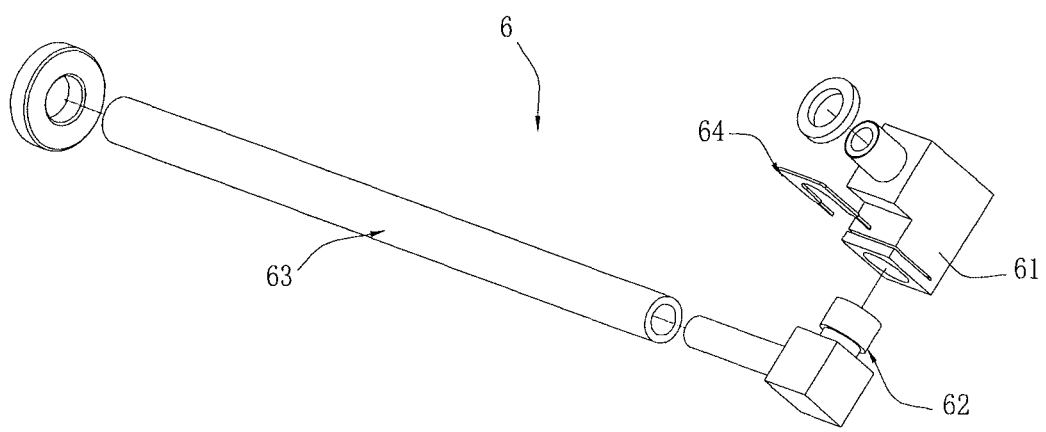
FIG. 9 is a structural schematic view of one embodiment of the rice soup sucker according to the invention.

Seeing FIG. 9, the rice soup sucker 6 includes a right-angle bushing 61 provided at the bottom of the rice soup collecting container 3, a horizontal tube 62 and a swing tube 63 connected with the horizontal tube 62 at right angle. The horizontal tube 62 is inserted in the right-angle bushing 61 and is fixed by a snap spring 64, such that the swing tube 63 can swing about the right-angle bushing 61 without disengaging from it.

The rice soup collecting container 3 may not be provided with the rice soup outlet at the bottom thereof, and is only used to collect the rice soup. The rice soup may be poured into the heating boiler body manually when cooking the rice crust congee.

Figure 22:
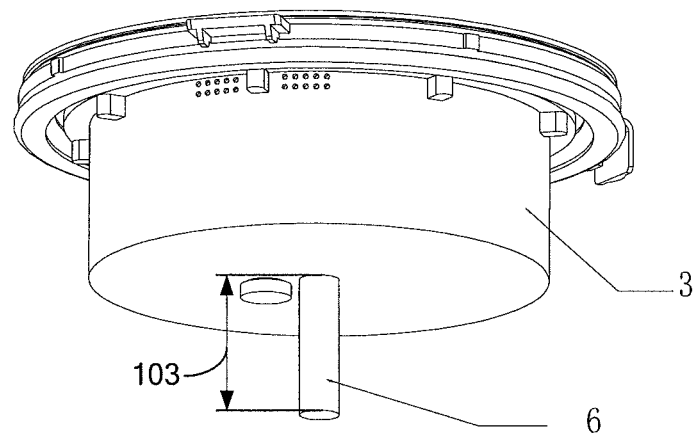
FIG. 22 is a schematic view of a fourth embodiment of the rice soup sucker according to the invention.

In the fourth embodiment of the rice soup sucker according to the invention, as shown in FIG. 22, the rice soup sucker 6 is inserted vertically in a sucker hole which is provided at the bottom of the rice soup collecting container 3, and can move up and down along the sucker hole. The wall of the rice soup sucker 6 is provided with scales which correspond to the amount of the rice filled. The insertion depth of the rice soup sucker within the heating boiler body 1 may be adjusted basing on the amount of the rice filled, so as to control the amount of the rice soup remained in the heating boiler body, and ensure the quality of cooked rice. When cooking the rice, the on-off valve at the rice soup outlet is opened, so that the pressure within the rice soup collecting container 3 is balanced, and the rice soup would not enter into the rice soup collecting container. When a predetermined temperature within the boiler is detected by the temperature sensor, the on-off valve is controlled to close, and at this moment, the rice soup is pressed into the rice soup collecting container 3 from the heating boiler body, until the opening of the rice soup sucker leaves the fluid level of the rice soup.

Another embodiment of the invention is shown in FIGS. 10 to 19. As illustrated in FIGS. 10 to 14, a fixing assembly 4' is mounted on the top of the rice soup collecting container 3. The fixing assembly 4' includes a fixing plate 41' and a second sealing ring 46. The fixing plate 41' is used to close the rice soup collecting container 3, and the second sealing ring 46 is located between the fixing plate 41' and the rice soup collecting container 3. Two hooks 42' and an elastic snap-fixing member 10 are provided on the fixing plate 41'. Each of the hooks 42' extends from the peripheral of the fixing plate 41' towards the edge of the rice soup collecting container 3 to coupled with a ring 35 provided at the side of the rice soup collecting container 3. The second sealing ring 46 may also be integrally formed with the sealing ring 7.

Figure 14:
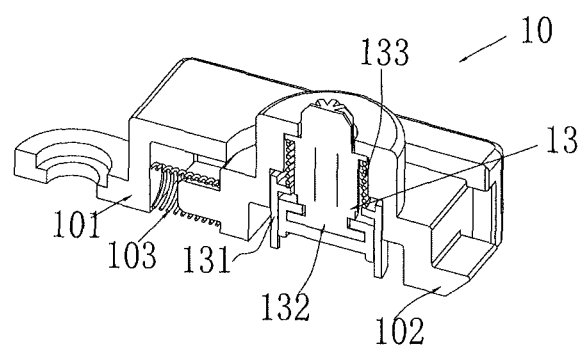
FIG. 14 is a sectional view of an elastic snap-fixing member in FIG. 11.

As shown in FIG. 14, the elastic snap-fixing member 10 includes: a fixing casing 101, a telescopic member 102 and a first spring 103. The fixing casing 101 is mounted on the top of the fixing plate 4', and the telescopic member 102 is mounted in the fixing casing 101 telescopically to connect with the snap finger 36 that is provided at the side of the rice soup collecting container 3. The first spring 103 is located between the fixing casing 101 and the telescopic member 102.

Figure 10:
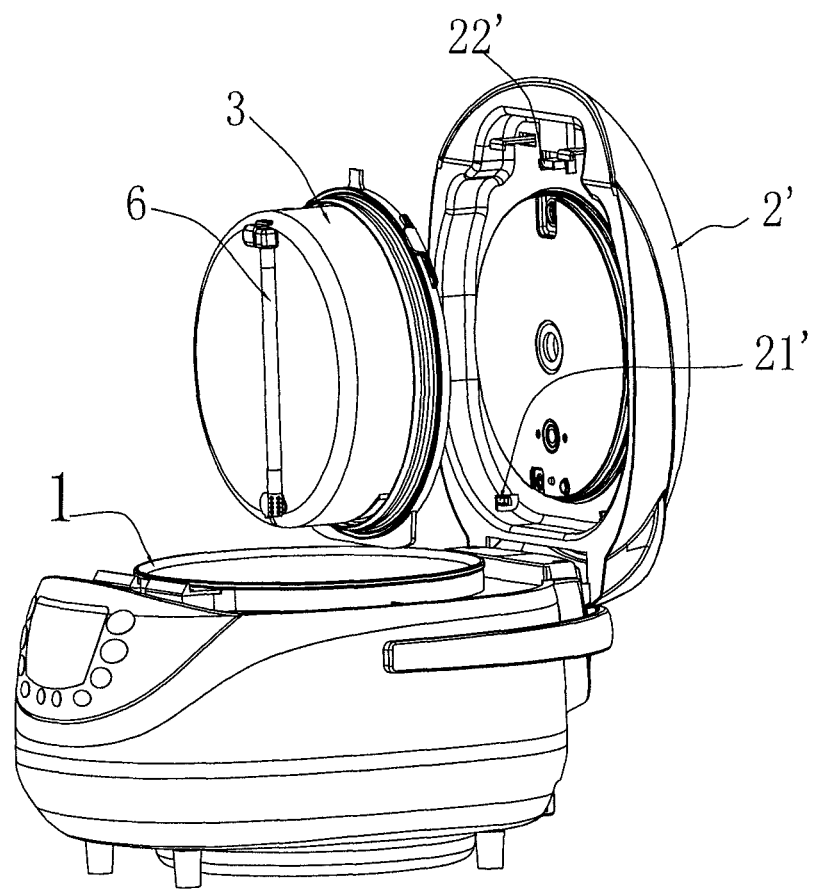
FIG. 10 is a perspective view of another embodiment of the multi-functional electric cooker according to the invention.
Figure 11:
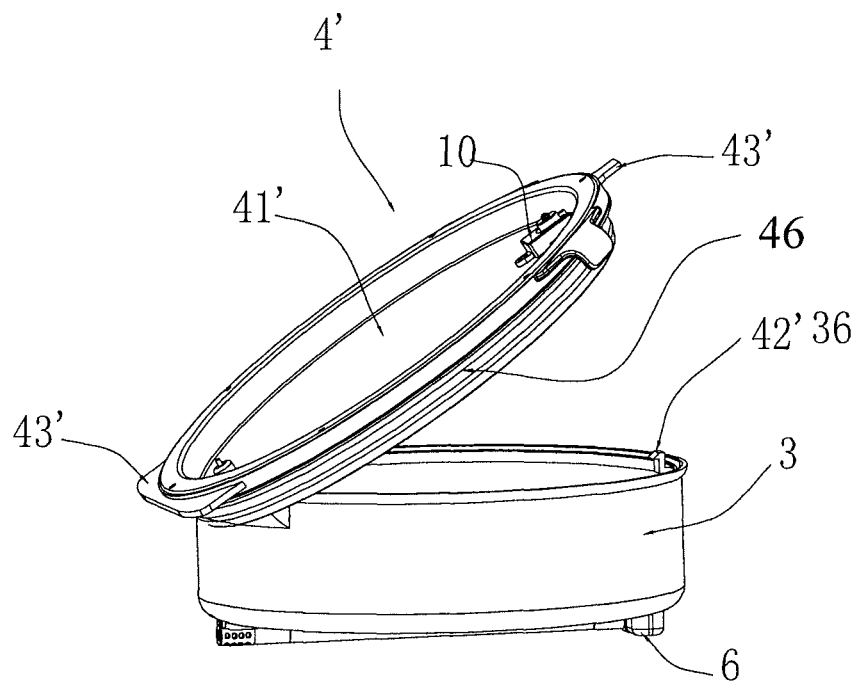
FIG. 11 is an exploded view of the rice soup collecting container and the fixing cover which are shown in FIG. 10.
Figure 12A:
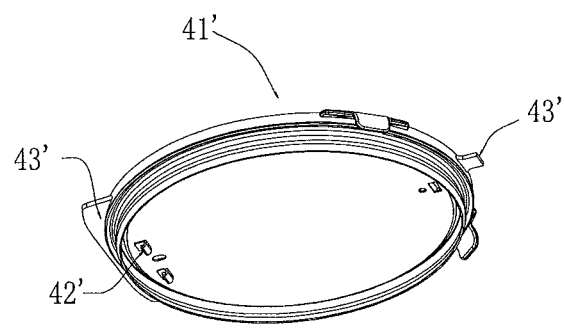
FIGS. 12a and FIG. 12b are a bottom view and a top view of the fixing cover in FIG. 11, respectively.
Figure 12B:
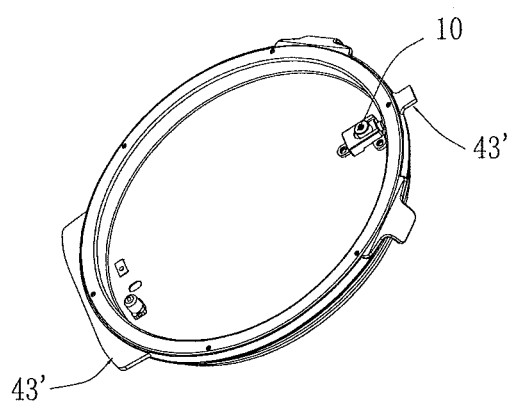
Figure 13:
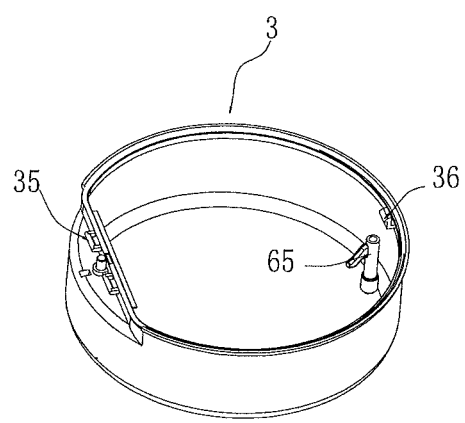
FIG. 13 is the top view of the rice soup collecting container in FIG. 11.

Referring to FIGS. 10, 12a and 12b, three radial bulges 43' are provided on the peripheral of the fixing plate 4'. Two of the bulges correspond to the holes 21' provided at the inner side of the cover 2', and the third bulge corresponds to an elastic ring clasp 22' provided at the front end of the cover.

Figure 15:
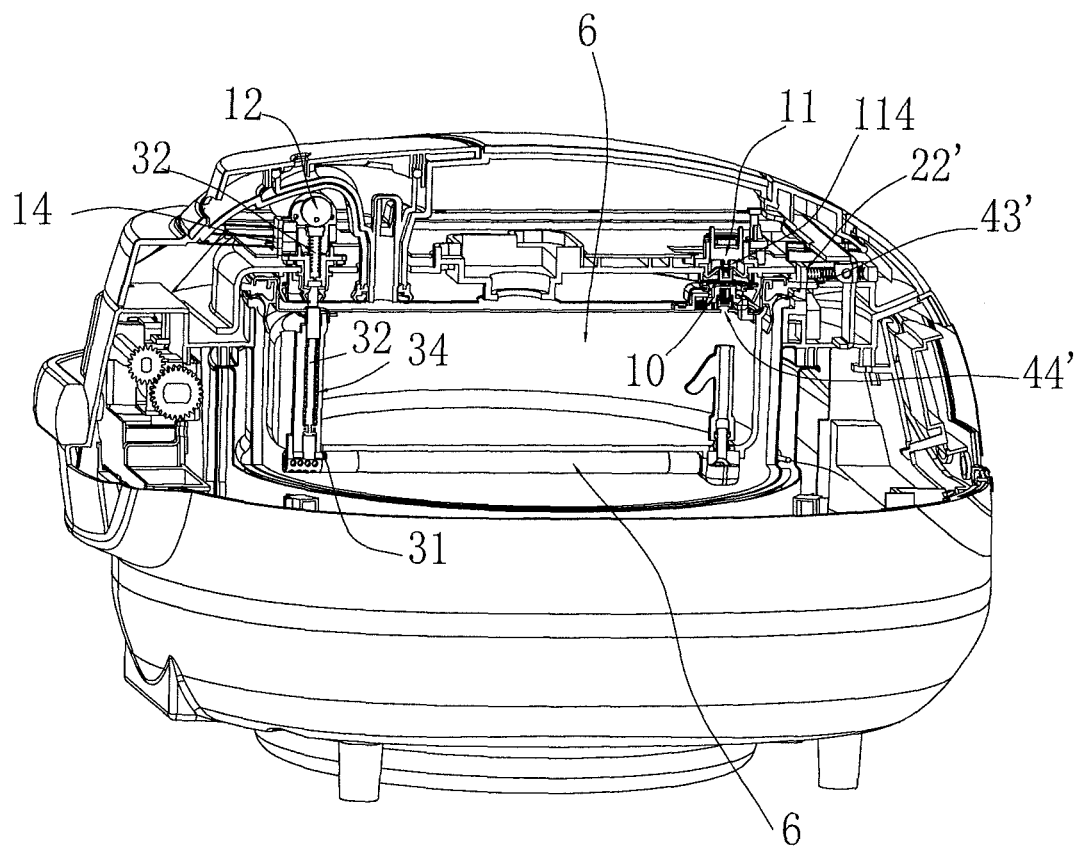
FIG. 15 is partial sectional view of the electric cooker in FIG. 10.
Figure 16:
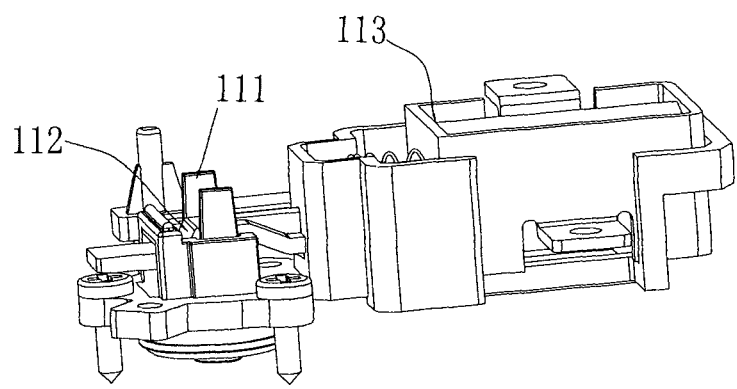
FIG. 16 is a perspective view of a driving component in FIG. 15.

Seeing FIG. 15, a steam escaping hole 44' is provided on the fixing plate 41', and a steam escaping valve 13 is provided above the steam escaping hole 44'. The steam escaping valve 13 includes:

a supporting seat 131 mounted in a valve cavity which is provided in the telescopic member 102, having an annular sidewall and an annular supporting end extending from the annular sidewall inwardly;

a valve core 132, one end thereof being located in the supporting seat 131, and the other end protruding from the top of the telescopic member 102;

a second spring 133 located between the annular supporting end and the valve core 132; and a driving component 11 for driving the valve core 132.

The driving component 11 includes:

a pressing rod 111 abutting against the top of the valve core 132;

a driving rod 112, one end thereof having a driving inclination surface and located on the top of the pressing rod 111, and the other end being connected to a electromagnetic driving member 113; and a return spring 114 for returning the pressing rod 111.

Figure 19:
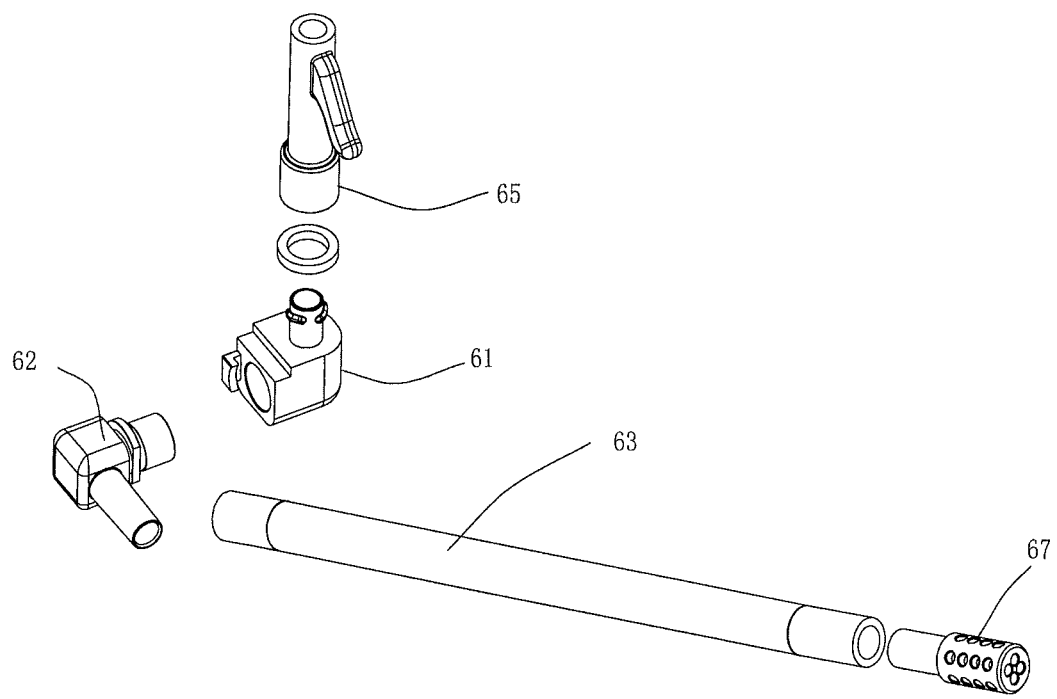
FIG. 19 is an exploded structural view of the rice soup sucker in FIG. 10.

Referring to FIG. 19, in this embodiment, the rice soup sucker 6 includes a right-angle bushing 61 provided at the bottom of the rice soup collecting container 3, a guiding tube 65 extending from the right-angle bushing 61 into the rice soup collecting container 3, a horizontal tube 62 and a swing tube 63 connected with the horizontal tube 62 at right angle. The horizontal tube 62 is connected to the right-angle bushing 61. The right-angle bushing 61 is connected with the guiding tube 65 in a screw-type snap connection, and the right-angle bushing 61 is connected with the horizontal tube 62 in a bayonet connection. A filter 67 is provided at the suction inlet of the swing tube 63 of the rice soup sucker to prevent rice grains from entering into the sucker and blocking the rice soup sucker. The filter 67 and the suspending device 8 may be made into one piece.

As shown in FIG. 15, the pushing bar 32 is mounted within the rice soup outlet 31. The bottom of the pushing bar 32 is fitted with an on-off valve for closing the rice soup outlet, and the top of the pushing bar 32 is connected with a cam-driven device 12. A return device for maintaining the on-off valve at a return position where the on-off valve closes the rice soup outlet 31 is also mounted on the pushing bar 32. The return device is a third spring 34 in FIG. 15.

Figure 17:
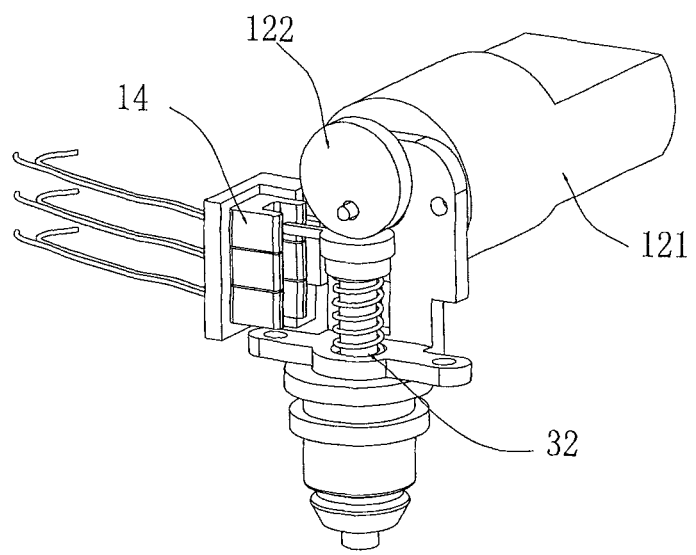
FIG. 17 is a perspective view of a cam-driven device in FIG. 15.

Referring to FIGS. 15 and 17, the cam-driven device 12 includes a motor 121 and a cam 122 mounted on the motor shaft.

A detecting device for detecting the position of the pushing bar 32 is provided alongside the pushing bar 32. In this embodiment, the detecting device includes three photoelectric switches 14 provided axially along the pushing bar 32. When the photoelectric switches 14 detect that the pushing bar has arrived at a certain position, the motor 121 is controlled to stop.

Figure 18A:
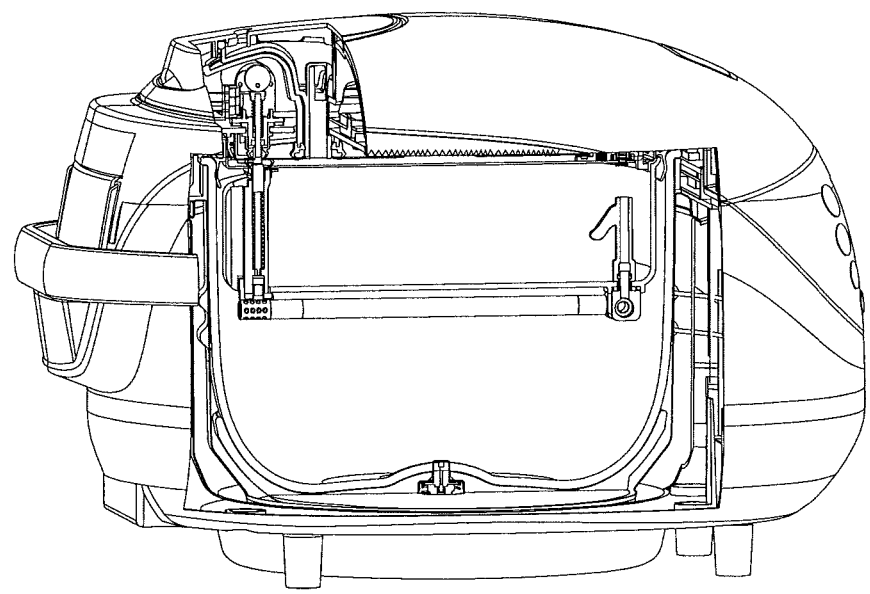
FIGS. 18a to 18c are schematic views showing the action of the rice soup sucker in FIG. 15 when being in various positions.
Figure 18B:
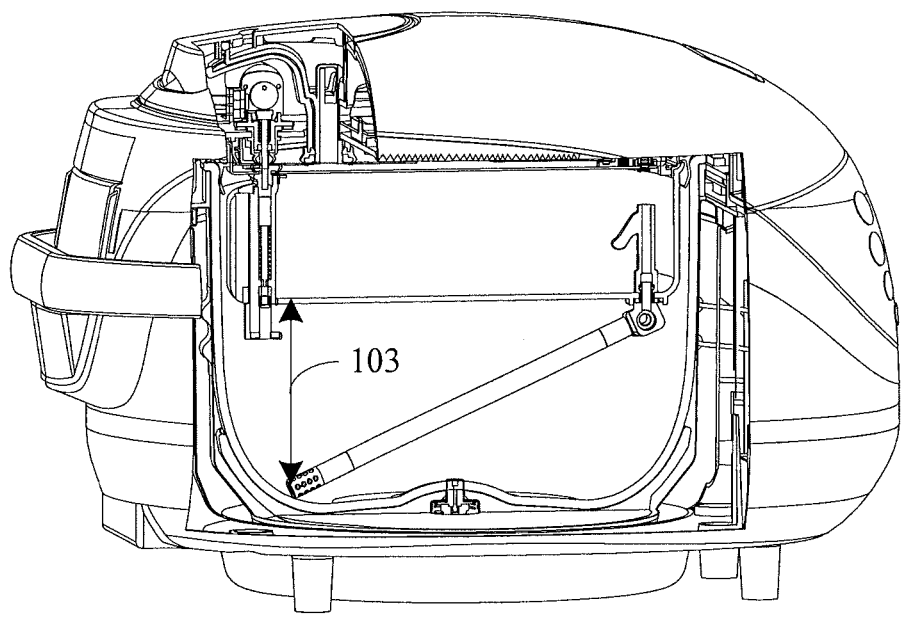
Figure 18C:
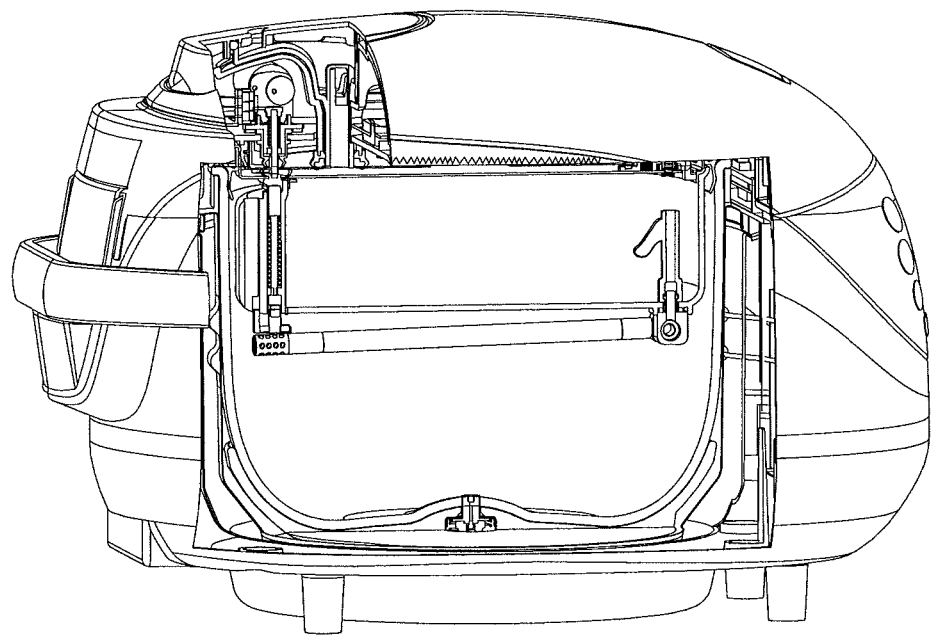

FIGS. 18a to 18c illustrates respectively the rice soup sucker in a cooking position, in a position for discharging the rice soup and in a position for sucking the rice soup.

Figure 20:
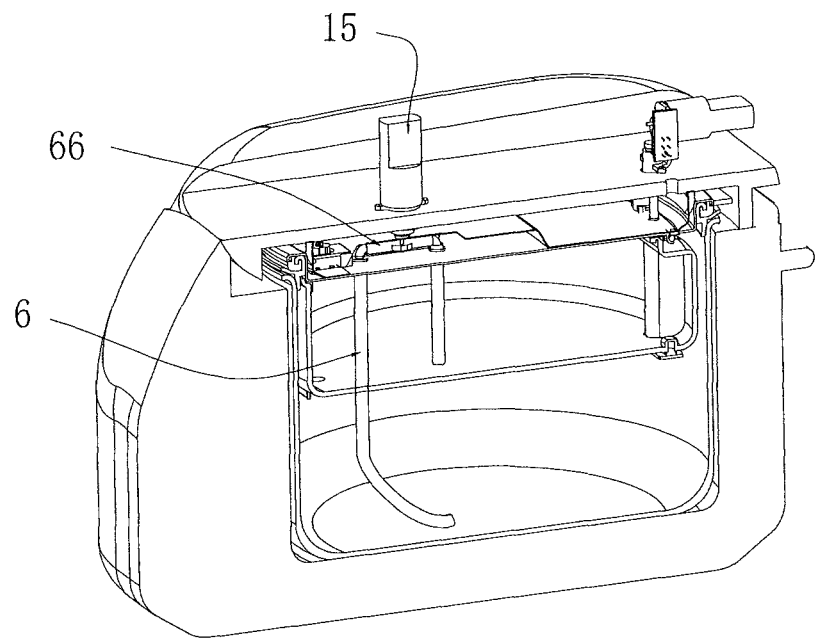
FIG. 20 is a schematic view of another embodiment of the rice soup sucker according to the invention.
Figure 21:
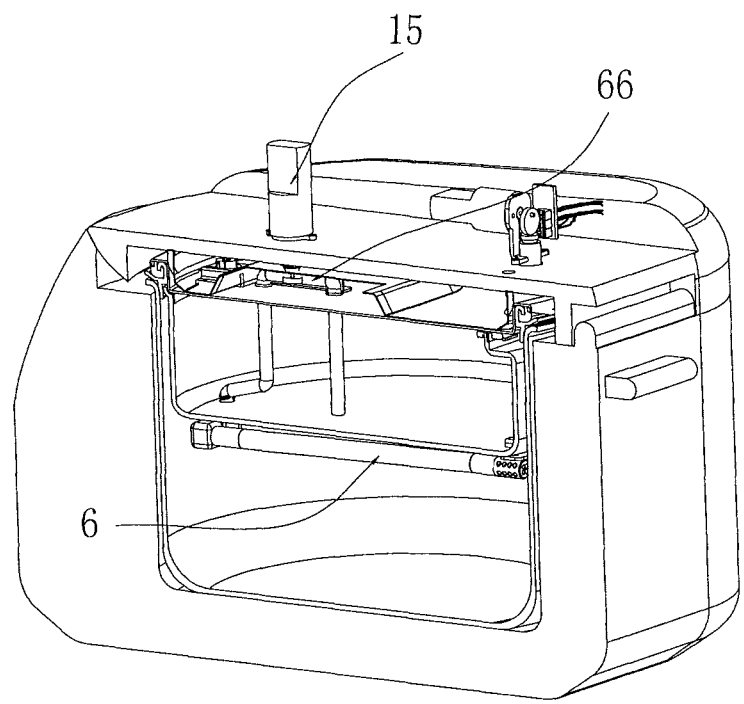
FIG. 21 is a schematic view of a third embodiment of the rice soup sucker according to the invention.

FIGS. 20 and 21 illustrate another two embodiments of the rice soup sucker according to the invention. The rice soup sucker 6 is provided at the middle portion thereof with a hose 66 which is located at the top of the fixing plate 4', and a pipe peristaltic pump 15 is provided and clamped outside of the hose 66, such that the pipe peristaltic pump 15 can press the wail of the hose 66 by a cam to generate suction force for pumping the rice soup within the heating boiler body 1 into the rice soup collecting container 3, or pumping the rice soup within the rice soup collecting container 3 into the heating boiler body 1. The difference between FIG. 20 and FIG. 21 lies in that the rice soup sucker 6 extending into the heating boiler body 1 in FIG. 20 adopts the hose, while the rice soup sucker 6 under the rice soup collecting container 3 in FIG. 21 adopts the swing tube shown in FIG. 19.

The above description is only the preferred embodiments of the invention. It should be noted that, those skilled in the art can also make many improvements and modifications without departing from the principle of the invention, and these improvements and modifications should also be deemed to fall into the protective scope of the invention.

What is claimed is:

1. A multi-functional electric cooker, comprising:
a heating boiler body; a cover;
a rice soup collecting container mounted between the heating boiler body and the cover;
a sealing ring provided between the rice soup collecting container and the heating boiler body; and
a rice soup sucker;
wherein an opening of one end of the rice soup sucker is located within the rice soup collecting container; and the other end of the rice soup sucker is extended through a bottom of the rice soup collecting container into the heating boiler body, and a distance from an opening of the other end of the rice soup sucker to the bottom portion of the rice soup collecting container is adjustable with the amount of rice in the heating boiler body, and
wherein the rice soup sucker is hinged at the bottom of the rice soup collecting container, and is provided with a suspending device at one end thereof, and a pushing bar is provided at the bottom of the rice soup collecting container and is configured to push the rice soup sucker away from the bottom of the rice soup collecting container when the heating boiler body is heated to a predetermined temperature and maintained for a set time.

2. The multi-functional electric cooker according to claim 1, wherein a fixing assembly is mounted on a top of the rice soup collecting container, the fixing assembly comprises:
a fixing plate for closing the rice soup collecting container, on which a fixing plate steam escaping hole is provided;
a fixing ring mounted on an edge of the fixing plate, on a periphery of which three insertion pieces are provided, among the three insertion pieces, at least one being a fixing insertion piece, and the other being elastic insertion pieces, each elastic insertion piece having a handle which corresponds to a hole of the cover at a corresponding position; and
a second sealing ring located between the fixing plate and the rice soup collecting container.

3. The multi-functional electric cooker according to claim 2, wherein the fixing assembly is connected with an edge of the rice soup collecting container by screws.

4. The multi-functional electric cooker according to claim 1, wherein a fixing assembly is mounted on a top of the rice soup collecting container, the fixing assembly comprises:
a fixing plate for closing the rice soup collecting container, the fixing plate comprising:
two hooks extending from a periphery of the fixing plate towards an edge of the rice soup collecting container and configured to be coupled with a hook loop provided at a side of the rice soup collecting container, and
a fixing plate steam escaping hole provided on the fixing plate, an elastic snap-fixing member, the elastic snap-fixing member comprising:
a fixing casing mounted on a top of the fixing plate,
a telescopic member mounted in the fixing casing telescopically and configured to connect with a snap finger that is provided alongside the rice soup collecting container, and
a first spring located between the fixing casing and the telescopic member; and
a second sealing ring located between the fixing plate and the rice soup collecting container.

5. The multi-functional electric cooker according to claim 4, wherein three radial bulges are provided on the peripheral of the fixing plate, two of the radial bulges correspond to holes provided at an inner side of the cover, and the third bulge corresponds to the elastic ring clasp provided at a front end of the cover.

6. The multi-functional electric cooker according to claim 4, wherein a steam escaping valve is provided above the steam escaping hole, the steam escaping valve comprises:
a supporting seat mounted in a valve cavity provided inside the telescopic member, and having an annular sidewall and an annular supporting end extending from the annular sidewall inwardly;
a valve core, one end thereof being located in the supporting seat, the other end thereof protruding out of a top of the telescopic member;
a second spring located between the annular supporting end and the valve core; and
a driving component for driving the valve core.

7. The multi-functional electric cooker according to claim 6, wherein the driving component comprises:
a pressing rod abutting against a top of the valve core;
a driving rod, one end thereof having a driving inclination surface and located on the top of the pressing rod, and the other end thereof being connected to an electromagnetic driving member; and
a return spring for returning the pressing rod.

8. The multi-functional electric cooker according to claim 1, wherein at least two insertion pieces are provided on a periphery of the rice soup collecting container, the insertion pieces are inserted in holes which are provided on the cover, a second sealing ring is provided between the rice soup collecting container and the cover, and a steam escaping hole is provided on a top of the cover.

9. The multi-functional electric cooker according to claim 8, wherein the number of the insertion pieces is three, and they are distributed evenly on a periphery of the rice soup collecting container, at least one of them is a fixing insertion piece, and the other are elastic insertion pieces, each elastic insertion piece has a handle.

10. The multi-functional electric cooker according to claim 1, wherein the suspending device is an iron ring or a magnetic ring, and a magnet is provided at a corresponding position of the bottom of the rice soup collecting container.

11. The multi-functional electric cooker according to claim 1, wherein the multi-functional electric cooker also comprises a rice soup outlet provided at the bottom of the rice soup collecting container, an on-off valve is provided at the rice soup outlet.

12. The multi-functional electric cooker according to claim 11, wherein the pushing bar is mounted in the rice soup outlet, a bottom end of the pushing bar is fitted with the on-off valve for closing the rice soup outlet, a top end of the pushing bar is connected with an electromagnetic driving device, and a return device for holding the on-off valve at a return position where the on-off valve closes the rice soup outlet is mounted on the pushing bar.

13. The multi-functional electric cooker according to claim 12, wherein the electromagnetic driving device comprises an electromagnetic driving member and a sliding block driven by the electromagnetic driving member, the sliding block comprises a horizontal sliding block and a vertical sliding block, one end of each of the horizontal sliding block and the vertical sliding block has a sliding inclination surface, and the horizontal sliding block and the vertical sliding block abut against each other via the sliding inclination surfaces, the other end of the horizontal sliding block abuts against the electromagnetic driving member, the other end of the vertical sliding block abuts against the pushing bar.

14. The multi-functional electric cooker according to claim 12, wherein a tube body extends upwardly from the rice soup outlet, a root of the tube body is provided with a hole, the return device comprises a third spring sleeved on the pushing bar, one end of the third spring clips on an annular boss provided in the tube body, and the other end of the third spring clips on a protrusion of the pushing bar.

15. The multi-functional electric cooker according to claim 1, wherein the rice soup sucker comprises a right-angle bushing provided at the bottom of the rice soup collecting container, a guiding tube extending from the right-angle bushing into the rice soup collecting container, a horizontal tube connected to the right-angle bushing and a swing tube connected with the horizontal tube at right angle.

16. The multi-functional electric cooker according to claim 15, wherein the right-angle bushing is connected with the guiding tube and the horizontal tube in a screw-type snap connection or in a bayonet connection.

17. The multi-functional electric cooker according to claim 11, wherein the pushing bar is mounted in the rice soup outlet, a bottom of the pushing bar is fitted with an on-off valve for closing the rice soup outlet, a top of the pushing bar is connected with a cam-driven device, and a return device for holding the on-off valve at a return position where the on-off valve closes the rice soup outlet is also mounted on the pushing bar.

18. The multi-functional electric cooker according to claim 17, wherein the cam-driven device comprises a motor and a cam mounted on a shaft of the motor.

19. The multi-functional electric cooker according to claim 17, wherein a detecting device for detecting position of the pushing bar is provided alongside the pushing bar.

20. The multi-functional electric cooker according to claim 19, wherein the detecting device is a photoelectric switch or a Hall element provided axially along the pushing bar.

21. A multi-functional electric cooker, comprising:
a heating boiler body;
a cover;
a rice soup collecting container mounted between the heating boiler body and the cover;
a sealing ring provided between the rice soup collecting container and the heating boiler body; and
a rice soup sucker;
wherein an opening of one end of the rice soup sucker is located within the rice soup collecting container; and the other end of the rice soup sucker is extended through a bottom portion of the rice soup collecting container into the heating boiler body, and a distance from an opening of the other end of the rice soup sucker to the bottom portion of the rice soup collecting container is adjustable with the amount of rice in the heating boiler body; and
wherein the rice soup sucker is vertically passed through the bottom portion of the rice soup collecting container, and is movable up and down.

22. The multi-functional electric cooker according to claim 21, wherein the multi-functional electric cooker further comprises a rice soup outlet provided at the bottom of the rice soup collecting container, an on-off valve is provided at the rice soup outlet.

23. The multi-functional electric cooker according to claim 22, wherein a pushing bar is provided in the rice soup outlet, the pushing bar is mounted in the rice soup outlet, a bottom of the pushing bar is fitted with an on-off valve for closing the rice soup outlet, a top of the pushing bar is connected with an electromagnetic driving device, and a return device for holding the on-off valve at a return position where the on-off valve closes the rice soup outlet is also mounted on the pushing bar.

24. The multi-functional electric cooker according to claim 23, wherein the electromagnetic driving device is mounted in the cover, and comprises an electromagnetic driving member and a sliding block driven by the electromagnetic driving member, the sliding block comprises a horizontal sliding block and a vertical sliding block, one end of each of the horizontal sliding block and the vertical sliding block has a sliding inclination surface, and the horizontal sliding block and the vertical sliding block abut against each other via the sliding inclination surfaces, the other end of the horizontal sliding block abuts against the electromagnetic driving member, the other end of the vertical sliding block abuts against the pushing bar.

25. The multi-functional electric cooker according to claim 23, wherein a tube body extends upwardly from the rice soup outlet, the return device comprises a spring sleeved on the pushing bar, one end of the spring clips on an annular boss provided in the tube body, and the other end of the spring clips on a protrusion of the pushing bar.

26. The multi-functional electric cooker according to claim 1, wherein a filter is provided at a suction inlet of the rice soup sucker.

27. The multi-functional electric cooker according to claim 2, wherein the rice soup sucker is provided at a middle portion thereof with a hose which is located at a top of the fixing plate, a pipe peristaltic pump is provided and clamped outside of the hose.

28. The multi-functional electric cooker according to claim 21, wherein a filter is provided at a suction inlet of the rice soup sucker.

29. The multi-functional electric cooker according to claim 4, wherein the rice soup sucker is provided at a middle portion thereof with a hose which is located at a top of the fixing plate, a pipe peristaltic pump is provided and clamped outside of the hose.

* * * * *